(12) United States Patent
Schwartz et al.

(10) Patent No.: US 9,868,671 B2
(45) Date of Patent: *Jan. 16, 2018

(54) METHOD OF MAKING A HYDROGEN TRANSPORT MEMBRANE AND ARTICLE

(71) Applicant: PRAXAIR TECHNOLOGY, INC., Danbury, CT (US)

(72) Inventors: Joseph M. Schwartz, Williamsville, NY (US); Joseph M. Corpus, Avon, IN (US); Hankwon Lim, East Amherst, NY (US)

(73) Assignee: Praxait Technology, Inc., Danbury, CT (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/738,345

(22) Filed: Jun. 12, 2015

(65) Prior Publication Data

US 2015/0274598 A1    Oct. 1, 2015

Related U.S. Application Data

(63) Continuation of application No. 13/542,286, filed on Jul. 5, 2012, now Pat. No. 9,084,970.

(51) Int. Cl.
*B01D 67/00* (2006.01)
*B01D 53/22* (2006.01)
(Continued)

(52) U.S. Cl.
CPC ............ *C04B 35/48* (2013.01); *B01D 53/228* (2013.01); *B01D 67/0039* (2013.01);
(Continued)

(58) Field of Classification Search
CPC .............. B01D 53/228; B01D 67/0039; B01D 67/0069; B01D 69/10; B01D 69/105;
(Continued)

(56) References Cited

U.S. PATENT DOCUMENTS 6,761,929 B2  7/2004 Damle
6,776,941 B2  8/2004 Apte et al.
(Continued)

FOREIGN PATENT DOCUMENTS

JP  2006218402  8/2006
JP  2008246315  10/2008
JP  2011143335  7/2011

OTHER PUBLICATIONS

Faes et al. "In Situ Reduction and Oxidation of Nickel from Solid Oxide Fuel Cells in a Transmission Electron Microscope". ECS Transactions, vol. 25, Issue 2, (2009), pp. 1985-1992.
(Continued)

*Primary Examiner* — Jason M Greene
(74) *Attorney, Agent, or Firm* — Lurie A. Schwartz (57) ABSTRACT

The present invention relates to a method of manufacturing a hydrogen transport membrane and the composite article itself. More specifically, the invention relates to producing a membrane substrate, wherein the ceramic substrate is coated with a metal oxide slurry, thereby eliminating the need for an activation step prior to plating the ceramic membrane through an electroless plating process. The invention also relates to modifying the pore size and porosity of the substrate by oxidation or reduction of the particles deposited by the metal oxide slurry.

5 Claims, 3 Drawing Sheets

(51) Int. Cl.
*C04B 35/48* (2006.01)
*C04B 38/06* (2006.01)
*C01B 3/50* (2006.01)
*B01D 71/02* (2006.01)
*B01D 69/10* (2006.01)

(52) U.S. Cl.
CPC ......... *B01D 67/0069* (2013.01); *B01D 69/10* (2013.01); *B01D 69/105* (2013.01); *B01D 71/024* (2013.01); *C01B 3/503* (2013.01); *C01B 3/505* (2013.01); *C04B 38/068* (2013.01); *B01D 2323/18* (2013.01); *C01B 2203/0405* (2013.01)

(58) Field of Classification Search
CPC ................ B01D 71/022; B01D 71/024; B01D 2323/18; B01D 2323/283; C01B 3/503; C01B 5/505; C04B 35/48
See application file for complete search history.

(56) References Cited

U.S. PATENT DOCUMENTS

| | | | |
|---|---|---|---|
| 6,964,697 B2 | 11/2005 | Pan et al. | |
| 7,175,694 B2 | 2/2007 | Ma et al. | |
| 7,531,215 B2 | 5/2009 | Apte et al. | |
| 7,604,771 B2 | 10/2009 | Song et al. | |
| 7,744,675 B2 | 6/2010 | Saukaitis et al. | |
| 7,781,049 B2 | 8/2010 | Apte et al. | |
| 7,959,716 B2 | 6/2011 | Song et al. | |
| 8,101,243 B2 | 1/2012 | Way et al. | |
| 9,084,970 B2* | 7/2015 | Schwartz | B01D 53/228 |
| 2003/0213365 A1 | 11/2003 | Jantsch et al. | |
| 2004/0033886 A1* | 2/2004 | Simwonis | H01M 4/8605 502/101 |
| 2005/0089740 A1* | 4/2005 | Moon | H01M 4/8621 429/425 |
| 2006/0016332 A1 | 1/2006 | Ma et al. | |
| 2006/0228897 A1* | 10/2006 | Timans | H01L 21/67115 438/758 |
| 2007/0044663 A1 | 3/2007 | Song et al. | |
| 2007/0110991 A1 | 5/2007 | Apte et al. | |
| 2008/0038567 A1 | 2/2008 | Way et al. | |
| 2009/0120293 A1 | 5/2009 | Saukaitis | |
| 2010/0092842 A1* | 4/2010 | Rose | C04B 35/48 429/528 |
| 2011/0232821 A1 | 9/2011 | Saukaitis et al. | |
| 2012/0046187 A1* | 2/2012 | Baba | B01F 11/0022 506/9 |
| 2013/0273456 A1* | 10/2013 | Bae | H01M 4/8642 429/486 |
| 2013/0321979 A1* | 12/2013 | Park | H01G 4/30 361/305 |

OTHER PUBLICATIONS

Hidayat et al. "The Characterization of Nickel Metal Pore Structures and the Measurement of Intrinsic Reaction Rate During the Reduction of Nickel Oxide in $H_2$—$N_2$ and $H_2$—$H_2O$ Atmospheres". Minerals Engineering, vol. 21 (2008) pp. 157-166.

Paglieri et al. "A New Preparation Technique for Pd/Alumina Membranes with Enhanced High-Temperature Stability". Ind. Eng. Chem. Res., vol. 38, (1999) pp. 1925-1936.

* cited by examiner

METHOD OF MAKING A HYDROGEN TRANSPORT MEMBRANE AND ARTICLE

CROSS REFERENCE TO RELATED APPLICATIONS

This application is a continuation of prior U.S. application Ser. No. 13/542,286, filed Jul. 5, 2012, which is incorporated herein by reference.

BACKGROUND OF THE INVENTION

Field of the Invention

The present invention relates to a method of manufacturing a hydrogen transport membrane and the article itself. More specifically, the invention relates to producing a membrane substrate, where the ceramic substrate is coated with a metal oxide slurry, thereby eliminating the need for an activation step prior to coating the ceramic substrate through an electroless plating process. The metal oxide slurry also allows the pore size and porosity of the membrane substrate to be modified by controlling the extent of oxidation or reduction of the metal oxide deposited by the slurry.

Description of Related Art

Composite hydrogen transport membranes are used to separate hydrogen from a hydrogen containing feed for a variety of industrial processes. Such composite membranes can consist of a hydrogen transport material or membrane supported by a porous support such as a ceramic. Conventional processing and manufacturing techniques for hydrogen transport membranes require an activation step to provide active sites on the porous substrate prior to the application of a membrane onto the substrate in order for the membrane (or thin layer) to separate the hydrogen containing feed gas for a variety of industrial applications. Typically, this activation step requires the use of hazardous chemicals, additional processing steps, and prolongation of the fabrication time prior to the application of the membrane, which is typically applied through an electroless plating process.

In the related art, the substrate of the hydrogen transport membrane is prepared by sensitizing and activating it prior to the electroless plating. For example, U.S. Pat. No. 7,175,694 B2 to Ma et al. discloses the surface of a substrate should be sensitized and activated by aqueous tin chloride ($SnCl_2$) and palladium chloride ($PdCl_2$) solutions to seed Pd nuclei on the substrate before plating and this process should be repeated between two and ten times. It further discloses that a substrate could be plated without an activation step, but it resulted in a slow process extending time for plating.

In U.S. Pat. No. 6,761,929 B2 to Damle, the surface plated was sensitized with a sensitizing solution (tin chloride in hydrochloric acid) and activated with an activating solution (palladium chloride in hydrochloric acid) before plating.

Ind. Eng. Chem. Res. (38) 1925-1936, 1990 "A New Preparation Technique for Pd/Alumina Membranes with Enhanced High-Temperature Stability" by Paglieri et al discloses conventional and new methods for surface activation before plating. The conventional one used $SnCl_2$ and $PdCl_2$, while the new one used a palladium acetate solution followed by a heat treatment under $H_2$ environment. However, both methods still needed an activation step before plating.

U.S. Pat. No. 8,101,243 B2 to Way et al. describes making palladium-gold alloy membranes on porous supports. The electroless plating method used for depositing the alloy requires an activation step to seed the substrate with palladium crystals by any of a variety of methods, including impregnating with a solution of palladium acetate or another salt. Substrates manufactured with metallic crystals embedded in them or using metals other than palladium to seed plating are not considered.

U.S. Pat. Nos. 7,604,771 and 7,959,716 to Song et al. describe an increase in hydrogen flux with reduction of metal oxides used in membrane substrates. These oxides can be either mixed oxides, such as Sr—Fe—Co—O or NiO. These metal oxides were part of the substrate, not used as a surface coating. U.S. Patent Application Publication No. 2007/0044663 to Song et al. describes a substrate made from NiO/TZ-3Y, where TZ-3Y is partially stabilized zirconia. The nickel content in the substrate was about 50%. They showed that reducing the substrate caused pore size and hydrogen flux to increase.

Others have seen an effect of nickel oxide particles on pore size and porosity in solid oxide fuel cells (SOFC), but not with respect to using nickel oxide to produce hydrogen transport membranes. For example, Minerals Engineering (21) 157-166, 2008, "The characterization of nickel metal pore structures and the measurement of intrinsic reaction rate during the reduction of nickel oxide in $H_2$—$N_2$ and $H_2$—$H_2O$ atmospheres" by Hidayat et al. investigated the reduction of NiO in hydrogen mixtures at high temperature using scanning electron microscopes and observed a high volume fraction of micro-sized pores with nickel metal after reducing a NiO sheet in a stream of pure $H_2$ and mixtures of $H_2$—$N_2$ and $H_2$—$H_2O$.

ECS Transactions (25) 1985-1992, 2009 "In situ Reduction and Oxidation of Nickel from Solid Oxide Fuel Cells in a Transmission Electron Microscope" by Faes et al. discloses the basic idea concerning the effect of in situ reduction on NiO that is used as an electrolyte-supporting anode in SOFC. The reduction results in an increase in the anode porosity because of volume contraction between NiO and metallic Ni.

To overcome the disadvantages of the related art, it is an object of the present invention to eliminate the activation step required in electroless plating and significantly reduce processing time and costs. The present invention produces essentially same quality membranes and eliminates the activation step typically required before electroless plating.

It is also an object of the invention to produce a substrate where the pore size and porosity can be modified by oxidation and/or reduction of the surface so that the pore size and porosity are suitable for electroless plating, increasing membrane yield by enabling some substrates with pore sizes that are outside the acceptable range to be modified so that the pore sizes are appropriate and allowing minor modification of acceptable substrates to optimize membrane performance. It is a further object of the invention to provide a slurry employed in the treatment of the substrate to enable pore size modification while also eliminating the use of hazardous chemicals used for activation and eliminating processing steps in membrane production. It is yet another object of the invention to provide a composite membrane manufactured using the inventive process where the membrane is employed to separate a desired permeate, such as hydrogen, from a stream comprising the desired permeate and other materials. Further, it is an object of the invention to provide a membrane article to perform the desired separation.

Other objects and aspects of the present invention will become apparent to one of ordinary skill in the art upon review of the specification, drawings and claims appended hereto.

SUMMARY OF THE INVENTION

According to an aspect of the invention, a method of forming a membrane substrate is provided. The method includes:

forming a porous ceramic substrate, treating the ceramic substrate with a metal or metal oxide based slurry to deposit metal or metal oxide particles on the substrate wherein the surface pore size is reduced, and optionally, oxidizing or reducing the substrate to modify the pores of the substrate so that it is more suitable for depositing a membrane layer.

According to another aspect of the invention, a method of preparing a slurry employed in the fabrication of hydrogen transport membranes is provided. The method includes:

milling a metal oxide powder in a solvent, such as isopropyl alcohol, and evaporating the solvent, adding the milled metal oxide powder to a ceramic powder with a binder and further adding a pore former, such as carbon black to form a slurry utilized to deposit metal or metal oxide particles onto the porous substrate to facilitate an electroless plating process for the formation of a composite hydrogen transport membrane.

In accordance with yet another aspect of the present invention, a hydrogen transport membrane is provided. The membrane includes:

a porous ceramic substrate having two surfaces, wherein at least one surface of said substrate has been treated with a metal oxide slurry forming active sites;

a palladium metal or palladium alloy attached to one of the surfaces of said ceramic substrate via an electroless plating process, where the palladium metal or palladium alloy has plated to a surface treated with the metal oxide, wherein the pore size of the treated surface has been reduced, thereby forming a membrane permeable to hydrogen.

In accordance with another aspect of the invention, a method of forming a composite hydrogen transport membrane to separate hydrogen from a hydrogen containing feed is provided. The method includes:

forming a porous ceramic substrate, treating the ceramic substrate with a metal or metal oxide based slurry to deposit metal or metal oxide particles on the substrate in order to develop an affinity for a metal to be deposited, where the pore size at a surface of the ceramic substrate is reduced, and depositing a dense layer of palladium or palladium alloy by electroless plating onto the ceramic substrate to form a composite hydrogen transport membrane for separating hydrogen from a hydrogen containing feed.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

The present invention provides for the manufacturing of a composite hydrogen transport membrane wherein a porous substrate, preferably a ceramic one, is treated with a metal oxide slurry to develop active sites and is then plated through a conventional electroless plating process to form a thin palladium or palladium alloy dense, but thin layer. The method eliminates the need for an activation step which is generally carried out in the conventional electroless plating process. The substrate can be manufactured through several processes including isostatic pressing or extrusion of materials such as yttria-stabilized zirconia ceramic mixed with pore former(s), and the porosity can be graded or controlled in such a fashion so that the surface to be plated has very fine pores while the rest of the substrate has open porosity with minimal resistance to gas flow. These materials and methods of production are disclosed in co-assigned U.S. Pat. Nos. 6,776,941; 7,531,215; and 7,781,049, the contents of which are incorporated herein by reference in their entirety.

Figure 1:
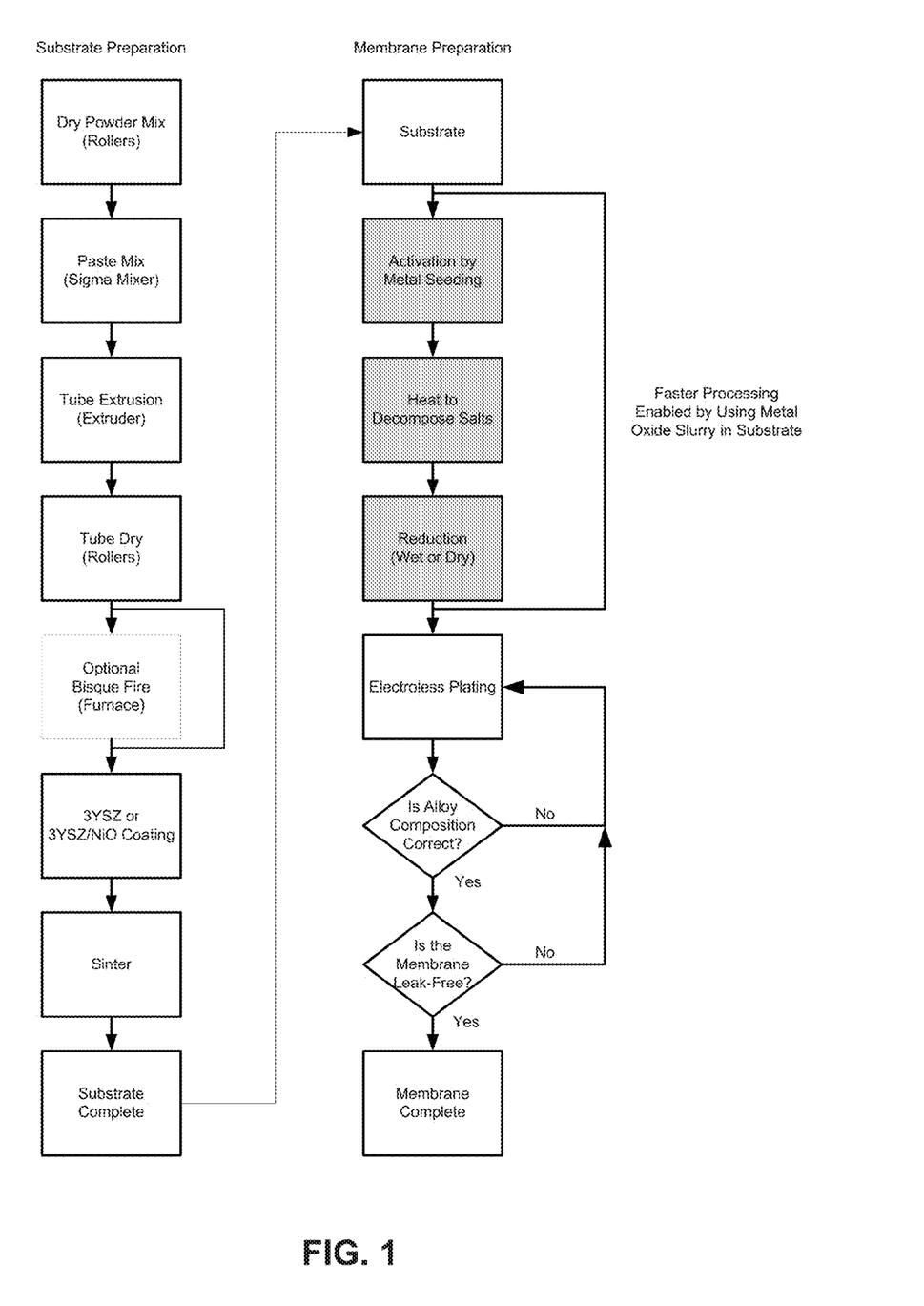
FIG. 1 is a process flow diagram for the production of the porous ceramic support and the hydrogen membrane.

With reference to FIG. 1, the process flow for one aspect of the present invention is provided. Generically, the dry components are blended on a roller mill overnight. The blend is placed in a sigma mixer or the like and allowed to paste using dispersant and water. The paste is placed on a ram extruder and extruded into tubular form. The extruded tubes are dried on drying rollers for approximately twenty four hours. In one alternative, the tubes are bisque fired to remove some or all of the organic materials. In another alternative, bisque firing is skipped. Thereafter, the tubes are coated or treated with the slurry of the present invention, as discussed in detail below. More specifically, the coating can be performed on a speed controller slide using a viton wipe system. After the slurry has dried, the sites are activated and an affinity for the metal to be deposited by electroless plating is attained. The slurry is first allowed to dry, and the tubes are placed into a furnace and hang fired to sinter them. The sintered tubes are typically activated by depositing a metal salt solution, typically using Pd or Sn-based salts, heating to decompose the salt, and reducing the metal ions using wet or dry reduction. The substrate is then plated and annealed to produce the final membrane. Plating can require several cycles depending on the desired composition and thickness of the separation layer. If subsequent plating cycles are too slow, it is possible to reactivate between plating cycles. Using the metal oxide slurry of the present invention, and as shown by the shaded boxes in FIG. 1, allows steps to be skipped in producing the membrane.

Process Flow

Dry Powder Mix

The porous ceramic substrate can be made of zirconium oxide powder containing about 3 mole percent yttrium oxide, or another ceramic material. Such powder is available from a wide variety of sources and preferably has a mean particle diameter of about 0.5 micrometers. The powder can be added to a container, such as a container in the presence of a binder, which is added in an amount of 4-6 weight percent. The binder can be a polyvinyl alcohol or a water soluble polymer sold by Dow under the trademark Methocel™. The mixed granulated powder has about 26-30 wt % pore former, about 4-6 wt % binder, and the balance is ceramic powder, such as yttria stabilized zirconia. The container is placed on a roller mill and blended for 12-24 hours.

Paste Mix

The blended powders are added to a chamber of a controlled temperature sigma blade mixer, or the like, at temperatures from about 45-65° F. The mixer is activated, while a dispersant such as water is slowly added. After mixing, a paste begins to form. A vacuum is pulled on the paste and trapped air is removed.

Tube Extrusion, Drying and Drilling

The stiff paste is added into the barrel of a ram extruder. Tubes are formed by forcing the paste through a die assembly. The resulting tubes are flexible in this state and are placed on drying rollers, or the like, for approximately 24 hours. After drying, the tubes are strong enough to handle. A small hole is drilled near an end of the tube to provide a means to hold the tube while it is sintered by hang firing, as discussed below. Although the formation of the paste discussed herein is via an extrusion process, it is envisioned that other processes such as isostatic pressing, and coating as discussed in co-assigned U.S. Pat. Nos. 6,776,941; 7,531, 215; and 7,781,049 are also suitable methods for preparing the substrate.

Slurry Preparation—NiO Milling

In the present invention, metal oxides are employed in an yttria stabilized zirconia slurry to treat the ceramic membrane. Although the discussion below is with respect to nickel oxide, other metals that can be oxidized and reduced can be added to the slurry and ultimately initiate the plating of the transport membrane (i.e., dense layer) onto the ceramic substrate. For example, other metals or metal oxides (such as iron), or combinations thereof, that have good affinity for palladium can be employed. Copper is also a good candidate because it alloys with palladium. Palladium can also be added to a slurry for coating an original substrate before plating. In this case, optimum concentration of palladium should be determined since palladium is an expensive chemical. In selecting possible metals, a reduction temperature of metal oxides should be also considered in addition to its affinity for palladium. Because a palladium membrane is not durable at temperatures much higher than 650° C., metal oxides that are reduced at temperatures higher than 650° C., for example silver, are less preferred. Metals that are reduced easily can be added to a slurry so that less reducing agent (hazardous and toxic) is used to initiate plating. A standard reduction potential of metal ions can be used as a reference in selecting metals that can be easily reduced. Elements with a positive standard reduction potential such as gold, iron, and copper (Table 1, below) are easily reduced and can be used as alternatives to nickel in a slurry.

TABLE 1

Standard Reduction Potentials at 298 K, 1M, 1 atm

| Half-Reaction | Standard Reduction Potential, E° (V) |
| --- | --- |
| $Au^{3+} + 3\ e^- \rightarrow Au$ | +1.50 |
| $Fe^{3+} + e^- \rightarrow Fe^{2+}$ | +0.77 |
| $Cu^{2+} + 2\ e^- \rightarrow Cu$ | +0.34 |
| $Ni^{2+} + 2\ e^- \rightarrow Ni$ | −0.25 |
| $Zn^{2+} + 2\ e^- \rightarrow Zn$ | −0.76 |
| $Mg^{2+} + 2\ e^- \rightarrow Mg$ | −2.37 |
| $Li^+ + e^- \rightarrow Li$ | −3.05 |

In addition to using a different metal, a combination of metals might be desirable. For example, different metals could have different reduction kinetics or reduce at different temperatures. This could allow for easier control of the extent of reduction. The final choice would need to be based on overall performance considering the final membrane flux and durability, all processing steps and conditions, and total cost. The relative expansion of the material when oxidized or shrinkage when reduced is also a consideration because its effect on changing pore size may be related to the size change of the particle with varying oxidation state.

With respect to nickel oxide, the starting material requires particle size reduction as these particles are generally larger than 10 μm. Thus, the nickel oxide powder employed exhibits a purity of 99.98% and a mesh size of about 325 (i.e., <10 μm) particle size. The powder is milled in a solvent such as isopropyl alcohol for about 16 hours using ceramic beads having an outside diameter of ⅜ of an inch. After milling, the isopropyl alcohol is evaporated and the nickel oxide particles are generally smaller than 1 μm and are ready to be used. The particles must be small enough to reduce the pore size on the substrate surface.

Slurry Mixing

The slurry is prepared by employing about 20-30 wt % nickel oxide in yttria stabilized zirconia, where the yttria is about 3 mol %. With this formulation, an additional 10% porosity is created after nickel oxide reduction as described below. The slurry is a toluene/ethanol-based mix implementing poly-vinyl butyral as the base binder component. A polyester/polyamide copolymer dispersant, or the like, such as KD-1 and which is compatible with this solvent system can be employed. It is worth noting that pore former amount (carbon black) may be reduced due to the porosity created by the nickel oxide reduction.

The unique slurry composition developed eliminates the activation steps required in conventional electroless plating of palladium or palladium alloys and improves membrane production yield by providing a substrate with smaller surface pores, making it more likely that a palladium or palladium alloy coating applied to it will sufficiently cover the pores to produce a membrane with an acceptable leak rate. It is important to the invention to add nickel oxide into the slurry and form a nickel oxide slurry which is employed in the coating of the ceramic tubes. The nickel or nickel oxide particles deposited perform as active sites for subsequent palladium or palladium alloy plating and reduce surface pore size on the surface to be plated. Basically, the slurry includes yttria stabilized zirconia, nickel oxide, and carbon black (pore former). In an exemplary embodiment, the slurry contains yttria stabilized zirconia, 20-30 wt % nickel oxide, and carbon black. In the preferred embodiment, the composition of the slurry is as shown in Table 2, below.

TABLE 2

The Composition of Slurry Containing Nickel Oxide

| | YSZ | NiO | Carbon black |
| --- | --- | --- | --- |
| wt % | 67.6 | 25.0 | 7.4 |

This slurry composition is very flexible depending on the desired reactivity, pore size, and pore size distribution. For example, the composition of nickel oxide can be increased to render the ceramic substrate more reactive so that plating time can be shortened. The composition of nickel oxide and carbon black can be optimized to make a substrate having a desired range of pore sizes and pore size distribution. If carbon black is used as a pore former, the amount added to the slurry should be controlled so that resulting pore sizes are small enough to be closed off by plating. The average pore size is preferably from about 0.1 to about 0.6 µm with a maximum pore size of less than about 1 µm. It is expected that the nickel oxide content could vary between about 5% to about 50% and that the carbon black in the slurry could be as low as about 5% and as high as about 25%.

Other pore formers or combinations of pore formers could be used to replace carbon black. These could be used to modify pore size or to change the burnout temperature of the pore former. Any small organic or carbon-based material could be used as a pore former. One example alternative pore former material is polymethyl methacrylate, which can be made into small particles and blended into the mix as a pore former. Particle size, burnout temperature, and potential agglomeration are factors used in deciding which pore former is used.

Other metal compounds with different anions can also be utilized. For example, nickel nitrate particles could also be utilized instead of nickel oxide. Alternatively, iron, gold, copper, platinum, palladium, silver, manganese, chromium, zirconium and oxides thereof can be employed as well. After reduction, it is expected that the remaining nickel would be independent of the starting compound as long as it was fully reduced in each case.

A higher surface coverage by metal oxides on a ceramic tube can accelerate subsequent plating by enhancing catalytic activity. The particle size of nickel oxide in an exemplary embodiment is about 0.25 to 0.5 µm and this can be changed to increase or decrease surface coverage. Active sites with smaller particles have a higher surface area than those with bigger particles to initiate plating. In addition, a slurry containing metal oxides with a narrow particle size distribution can be prepared by controlling a processing variable such as metal oxide concentration. To avoid particle agglomeration that may be caused by the possible densification of metal oxides, metal oxides should be dispersed well on a ceramic substrate to serve as independent active sites. In addition, a sintering temperature after dip-coating with a slurry can be carefully selected to avoid particle densification. The selected temperature depends on several factors, including the compositions of the slurry and substrate, and the particle size.

By adding reducible metal oxides to the slurry, a denser ceramic substrate can be prepared. This can help avoid the formation of big pores and enhance overall membrane product yield and strength. After reduction in hydrogen, a transition of metal oxide to metal leaves some pores that can enhance gas flow. Because pore sizes depend on a transition of metal oxide to metal, appropriate metal oxides that leave reasonable pore sizes after reduction can be selected.

Tube Exterior Coating

Utilizing the above described metal oxide slurry, the ceramic tube coating is carried out on the exterior surface through the use of a speed controlled vertical slide and viton wipe system. Slurry is injected into the wipe assembly. Coating is accomplished via a meniscus of the liquid as the assembly slowly moves down the tube length at speed ranging from about 200-400 mm/min although speeds as low as 80 mm/min have been employed. The viton wipe prevents the liquid from dripping past the viton/tube interface. Loss of liquid due to evaporation or waste is low as the system uses a small amount of liquid compared to a dipping method. Thickness uniformity is also increased as the slurry residence time is constant throughout the tube length.

Sintering

The formed tubes are hung by a pin that is placed through a hole drilled in the uncoated green state to facilitate hang firing, as previously discussed. For increased temperature uniformity the tubes are placed inside a muffle tube. Firing temperatures may vary from about 1200-1400° C. to customize density, depending on the ceramic material used. For zirconia, typical firing temperatures range from 1300-1350° C. for about 3-4 hours. Firing can be done in air.

Plating

Following sintering, the substrate is generally plated with palladium or a palladium alloy. Typically, this is carried out through a conventional electroless plating process which includes an activation step to deposit seed crystals on the substrate and a plating step to deposit a metallic film. With reference to FIG. 1, the process diagram of the conventional method and the process of the present invention are depicted. In the conventional process the substrate, such as a porous ceramic tube, is surface-activated by coating with an activation solution, such as dip coating with palladium acetate in chloroform. The activated tube is then heated in air to 350° C. to decompose any salts, producing palladium oxide, which is subsequently reduced to palladium by heating in hydrogen (dry method) or reduced in a solution containing a reducing agent, such as hydrazine, $N_2H_4$ (wet method). In contrast, in the present invention the electroless plating process is carried out without surface activation, heating, and reduction through the aforementioned steps. The elimination of these three steps reduces processing time and chemical costs.

The present invention also provides an opportunity to modify the surface pore size by partial or complete reduction of the nickel oxide particles deposited by the slurry. The deposited metal oxide particles from the slurry can be reduced by heating in hydrogen or another reducing gas (dry method) or by using a solution containing a reducing agent, such as hydrazine (wet method). Reducing metal oxide particles deposited by the slurry removes oxygen from the particles, which causes them to shrink, and increases gas flow through the substrate, which can increase flux through the membrane.

Once the substrate is prepared, the substrate is exposed to solutions containing the metal ions to be deposited and a reducing agent to initiate a plating cycle. For example, palladium can be deposited using a solution of palladium chloride and hydrazine. Stabilizers, such as ethylenediaminetetraacetic acid (EDTA), can also be added to the solution to modify stability of the ions in solution and affect the plating rate. Once the deposition is finished, the substrate is heated, which can decompose residual organics. In many cases, more than one plating cycle is required. If a palladium alloy is desired, different components of the alloy can be deposited in different cycles, or in some cases, co-plating more than one component at the same time can be done using more than one metal ion in the plating solution.

Example 1: Plating Without Activation

In accordance with the above-described process and composition, two ceramic tubes were extruded and produced in the same batch. After extrusion, the tubes were coated with slurry, as described in Table 2 using the method discussed above. The tubes were plated after sintering and were not activated using the activation step described above. These were cut into six pieces to a length of three centimeters each and denoted as S1 to S6. Stationary plating at room temperature without an activation step was carried out on these samples using two plating solutions, A and B, with and without EDTA, which is used as stabilizer. The solution compositions are shown in Table 3, below. Solution A, with EDTA, was utilized with substrates S1, S2, and S3 and solution B, without EDTA, was employed for substrates S4, S5, and S6.

TABLE 3

Composition of Plating Solutions

| | Solution A | Solution B |
| --- | --- | --- |
| $PdCl_2$ | 0.54 g | 0.54 g |
| $NH_4OH$ | 60.4 ml | 82.6 ml |
| $Na_2EDTA$ | 8.88 g | N/A |
| $H_2O$ | 161.2 ml | 161.2 ml |

Each sample was immersed for 3-4 hours at room temperature in a test tube filled with 20 ml of plating solution. Before plating, 1M hydrazine solution was added to the plating solution and the test tube was stirred vigorously to ensure complete mixing. Plating was carried out at room temperature. A wide range of hydrazine concentrations from 1.5×6× was used (1× hydrazine concentration, 1M, was equal to 0.12 ml). Depending on the stability of the plating solution, lower hydrazine concentration was used as shown in Table 4, below, to ensure solution stability. This is because the solution with no stabilizer, Solution B, was not sufficiently stable at the higher hydrazine concentrations that could be used for Solution A.

TABLE 4

Hydrazine Concentration for Each Sample

| | Solution A | | | Solution B | | |
| --- | --- | --- | --- | --- | --- | --- |
| | S1 | S2 | S3 | S4 | S5 | S6 |
| Amount 1× = 0.12 ml | 1.5× | 4.5× | 6× | 1.5× | 4.5× →2.3× | 6× →3× |
| Pd thickness (μm) | N/A | 2.6 | 2.7 | 2.3 | 2.9 | 2.7 |

Plating Solution A with EDTA as a Stabilizer

Little plating occurred on substrate S1 using the lowest hydrazine concentration (1.5×) while more of the substrate was plated on substrate S2 (4.5×) and substrate S3 (6×), as shown in Table 4, because of higher hydrazine concentrations. No palladium decomposition was observed with this solution indicating that a plating solution with EDTA is more stable at higher hydrazine concentrations than a solution without EDTA, which is discussed below. After the subsequent plating, all areas were successfully plated (100% coverage) and their respective film thicknesses were 2.6 and 2.7 μm for S2 and S3. S1 broke before plating was complete.

Plating Solution B Without EDTA as a Stabilizer

To keep the same hydrazine concentrations, hydrazine concentrations of 1.5×-6× were used for the first plating. However, the hydrazine concentrations were too high for S5 (4.5×∴2.3×) and S6 (6→3×) because rapid palladium decomposition was observed, possibly due to the absence of EDTA as a stabilizer.

At the first plating, all three substrate samples (S4, S5, S6) showed reasonably good plating (i.e., an almost complete coat). However, substrates S5 and S6 showed rapid palladium decomposition because of instability. After changing to lower hydrazine concentrations, no additional palladium decomposition was observed in either sample. Thereafter, the substrates were subsequently plated. Nearly complete coverage (approximately 100%) was observed in substrate S4 with a film thickness of 2.3 μm. However, incomplete coverage was observed in substrates S5 and S6, even at higher thickness, possibly due to palladium decomposition caused by excessive hydrazine concentration. These substrates would require additional plating cycles to form leak-free membranes.

Example 2: Effect of Reduction on Pore Size for a Tube with NiO Particles

Several other extruded tubes containing nickel oxide particles as seed crystals were prepared. Specifically, extruded ceramic tubes/substrates S7 and S8 were prepared with 25 weight percent nickel oxide, and reduction was carried out through a dry (S7) and a wet (S8) reduction method. S7 was treated in hydrogen at approximately 400° C. for about 20 hours, while S8 was immersed in a reducing solution containing hydrazine, ammonium hydroxide, and water at room temperature for about 6 hours.

Sample S7 Dry Reduction

Figure 2:
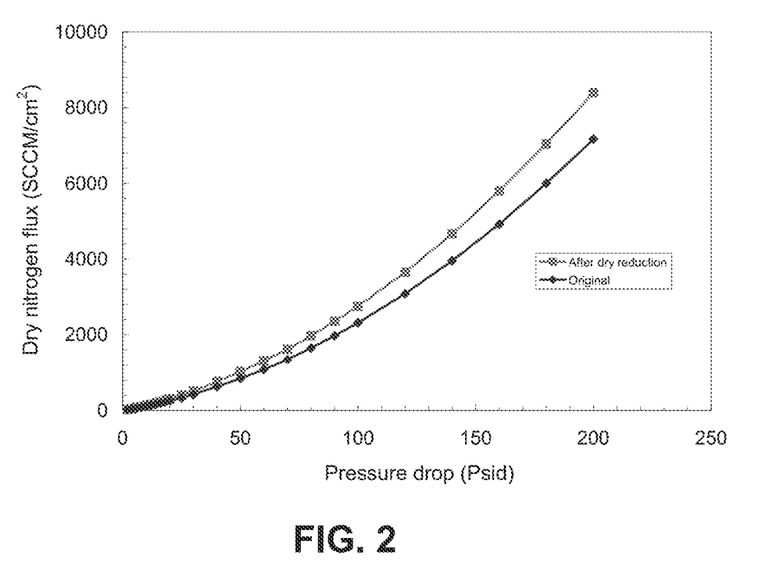
FIG. 2 depicts the air flow rates measured in a sample before and after dry reduction of sample S7.

FIG. 2 shows the measured air flow rates through the unplated substrate, S7, at room temperature before and after dry reduction. Dry reduction increased air flow rate by about 20%. This result supports a possible increase in porosity by nickel oxide reduction in hydrogen. Maximum pore size, as measured by a bubble point method, showed a slight increase from 1.0 to 1.1 μm after dry reduction, consistent with the increase in gas flow shown in FIG. 2.

Sample S8 Wet Reduction

Figure 3:
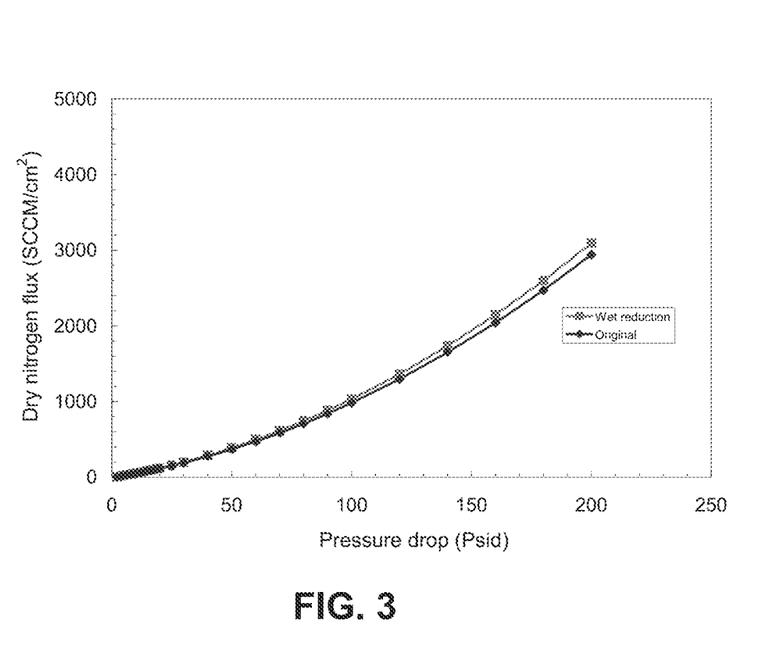
FIG. 3 illustrates the air flow rates measured in a sample before and after wet reduction of sample S8.

FIG. 3 shows the measured air flow rates through the unplated substrate, S8, at room temperature before and after wet reduction. Wet reduction slightly increased air flow rate by about 4%. The smaller increase due to wet reduction could be because the tube was not fully reduced and longer time or higher reducing agent concentration could have produced a result similar to dry reduction.

Sample S7 Re-Oxidation and Second Reduction

Figure 4:
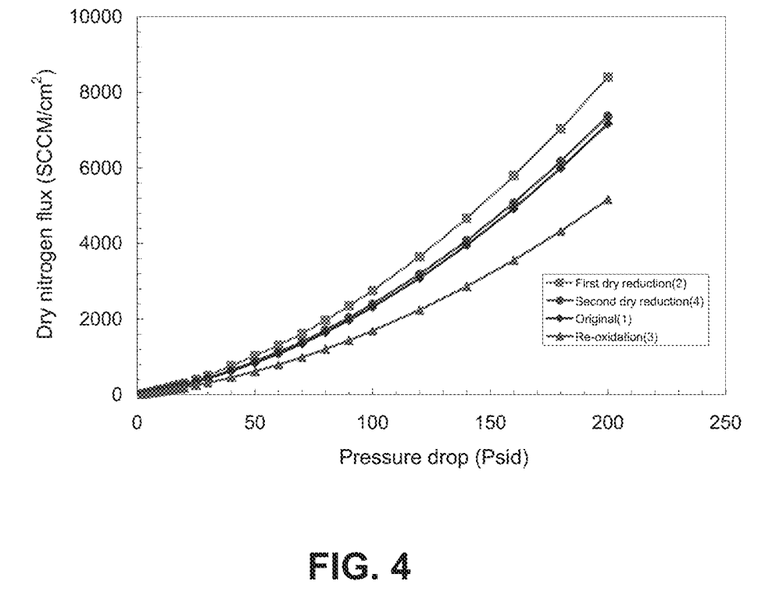
FIG. 4 depicts the air flow rates measured for sample S7 as originally prepared, after a first dry reduction, re-oxidation, and a second dry reduction.

Sample S7 was re-oxidized after dry reduction by heating at 600° C. for 5 hours in air to see if re-oxidation would close some open pores. FIG. 4 depicts air flow rate changes for sample tube S7 before oxidation/reduction treatments (1), and after the first dry reduction, which increased air flow (2), as shown in FIG. 2. FIG. 4 also shows air flow rate changes after subsequent oxidation, which decreased air flow (3), and after the second dry reduction, which increased air flow (4). As illustrated by curve (3) in FIG. 4, re-oxidation caused a decrease in the air flow rate by about 26% compared to the original values and the maximum pore size decreased slightly from 1.1 μm to 0.9 μm. Sample tube S7 was then reduced in hydrogen for a second time at approximately 400° C. for 20 hours. As shown by curve (4), the second dry reduction increased the air flow rate by about 40% compared to the air flow rate after re-oxidation. However, the air flow rate after the second dry reduction was lower than the air flow after the first dry reduction, even though they were reduced in the same conditions. While not wanting to be bound by any particular theory, it is possible that the reason for this is that the oxidation (3) modified the tube sample from the original, depicted in the figure as curve (1), resulting in a lower air flow rate. The results shown in FIG. 4 show that the pore size and porosity of a substrate coated using a slurry containing nickel oxide can be modified by changing the oxidation state of the particles through well-known oxidation and reduction methods. The impact of substrate treatment on gas flow through an unplated substrate is significant and can be controlled over a range of pore sizes to produce a substrate with desired properties for electroless plating.

While the invention has been described in detail with reference to specific embodiments thereof, it will become apparent to one skilled in the art that various changes and modifications can be made, and equivalents employed, without departing from the scope of the appended claims.

What is claimed is:

1. A method of preparing a slurry employed in the fabrication of a membrane substrate, comprising:
    milling a metal oxide powder in a solvent, and evaporating a portion of said solvent,
    adding the milled metal oxide powder to a ceramic powder with a binder and further adding a pore former to form a slurry utilized to deposit metal or metal oxide particles onto a separate ceramic substrate to facilitate an electroless plating process for the formation of a composite hydrogen transport membrane.

2. The method of claim 1, wherein the metal oxide is a nickel oxide.

3. The method of claim 1, wherein the ceramic powder is an yttria stabilized zirconia.

4. The method of claim 1, wherein the composition of solids in the slurry is 60-70 wt % yttria-stabilized zirconia, 20-30 wt % nickel oxide and the balance is carbon black.

5. The method of claim 1, wherein the composition of solids in the slurry is 67.6 wt % yttria-stabilized zirconia, 25 wt % nickel oxide and 7.4 wt % carbon black.

* * * * *

UNITED STATES PATENT AND TRADEMARK OFFICE
CERTIFICATE OF CORRECTION

PATENT NO. : 9,868,671 B2  
APPLICATION NO. : 14/738345  
DATED : January 16, 2018  
INVENTOR(S) : Joseph M. Schwartz et al.

Page 1 of 1

It is certified that error appears in the above-identified patent and that said Letters Patent is hereby corrected as shown below:

On the Title Page

Delete assignee and insert corrected assignee as follows:
--(73) Assignee: Praxair Technology, Inc., Danbury, CT (US)--

Signed and Sealed this
Twenty-second Day of October, 2019

Andrei Iancu
*Director of the United States Patent and Trademark Office*